United States Patent
Wang (10) Patent No.: US 7,502,730 B2
(45) Date of Patent: Mar. 10, 2009

(54) METHOD AND APPARATUS FOR FEDERATED UNDERSTANDING

(75) Inventor: Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 10/172,163

(22) Filed: Jun. 14, 2002

(65) Prior Publication Data

US 2003/0233223 A1    Dec. 18, 2003

(51) Int. Cl.
*G06F 17/27* (2006.01)
(52) U.S. Cl. .............. 704/9; 707/2; 707/3; 707/4; 707/5; 707/6; 707/103 R; 707/104.1
(58) Field of Classification Search ............ 704/9; 707/2–6, 103, 104.1
See application file for complete search history.

(56) References Cited

U.S. PATENT DOCUMENTS

| | | | | |
|---|---|---|---|---|
| 5,355,444 | A | 10/1994 | Chirico | 395/51 |
| 5,357,596 | A | 10/1994 | Takebayashi et al. | 704/275 |
| 5,414,797 | A | 5/1995 | Vassiliadis et al. | 395/51 |
| 5,748,974 | A | 5/1998 | Johnson | 395/759 |
| 5,761,663 | A | 6/1998 | Lagarde et al. | 707/10 |
| 5,892,813 | A | 4/1999 | Morin et al. | 379/88.01 |
| 5,982,367 | A | 11/1999 | Alimpich et al. | 345/347 |
| 5,995,921 | A | 11/1999 | Richards et al. | 704/9 |
| 6,044,347 | A | 3/2000 | Abella et al. | 704/272 |
| 6,173,266 | B1 | 1/2001 | Marx et al. | 704/270 |
| 6,192,354 | B1 | 2/2001 | Bigus et al. | 706/46 |
| 6,199,160 | B1 | 3/2001 | Echensperger et al. | 713/100 |
| 6,246,981 | B1 | 6/2001 | Papineni et al. | 704/235 |
| 6,311,150 | B1 | 10/2001 | Ramaswamy et al. | 704/1 |
| 6,356,869 | B1 | 3/2002 | Chapados et al. | 704/275 |
| 6,407,753 | B1 * | 6/2002 | Budinsky et al. | 715/764 |
| 6,421,655 | B1 | 7/2002 | Horvitz et al. | 706/61 |
| 6,456,974 | B1 | 9/2002 | Baker et al. | 704/270.1 |
| 6,490,560 | B1 | 12/2002 | Ramaswamy et al. | 704/250 |
| 6,493,673 | B1 | 12/2002 | Ladd et al. | 704/275 |
| 6,505,162 | B1 | 1/2003 | Wang et al. | 704/275 |
| 6,567,805 | B1 | 5/2003 | Johnson et al. | 707/5 |
| 6,704,743 | B1 * | 3/2004 | Martin | 707/103 R |
| 7,092,928 | B1 * | 8/2006 | Elad et al. | 706/60 |

(Continued)

OTHER PUBLICATIONS

U.S. Appl. No. 09/662,242, filed Sep. 14, 2000, Wang.

(Continued)

*Primary Examiner*—Patrick N Edouard
*Assistant Examiner*—Lamont M Spooner
(74) *Attorney, Agent, or Firm*—Theodore M. Magee; Westman, Champlin & Kelly, P.A.

(57) ABSTRACT

A method and apparatus are provided for resolving user input that crosses different application domains to identify a discourse item such as a command or entity. To resolve the input, a discourse item definition is selected based on the user input. The discourse item definition is associated with a first application and comprises at least one defining entity that is to be used to identify a discourse item. An entity definition associated with a second application is selected based on the user input, wherein the entity defined by the definition can fulfill the role of the defining entity in the discourse item definition. An entity is then identified using the entity definition and the user input. The discourse item is identified based on the identified entity, the discourse item definition and the user input.

9 Claims, 4 Drawing Sheets

U.S. PATENT DOCUMENTS

| | | | | |
|---|---|---|---|---|
| 7,171,352 | B2* | 1/2007 | Chang et al. | 704/9 |
| 2002/0138262 | A1 | 9/2002 | Kroeker et al. | 704/231 |
| 2003/0009446 | A1* | 1/2003 | Agarwal et al. | 707/2 |
| 2004/0054690 | A1* | 3/2004 | Hillerbrand et al. | 707/104.1 |
| 2004/0181390 | A1 | 9/2004 | Manson | 704/2 |
| 2007/0038610 | A1* | 2/2007 | Omoigui | 707/3 |

OTHER PUBLICATIONS

Jian Liu et al., "Combining Hierarchical Filtering, Fuzzy Logic, and Simulation with Software Agents for IP (Intellectual Propoerty) Selection in Electronic Design," International Journal on Artificial Intelligence Tools, vol. 10, No. 3, pp. 303-323 (Sep. 2001).

Stillger, M. et al., "A Communication Infrastructure for a Distributed RDBMS," Proceedings of the 6th International Euro-Par Conference, pp. 445-450 (Aug./Sep. 2000).

Devaney, M. et al., "Needles in a Haystack: Plan Recognition in Large Spatial Domains Involving Multiple Agents," Proceedings of the Fifteenth National Conference on Artificial Intelligence, pp. 942-947 (Jul. 1998).

Arai, S. et al., "Multi-Agent Reinforcement Learning for Planning and Scheduling Multiple Goals," Proceedings Fourth International Conference on MultiAgent Systems, pp. 359-360 (Jul. 2000).

Xiang, Y. et al., "Justifying Multiply Sectioned Bayesian Networks," Proceedings Fourth International Conference on MultiAgent Systems, pp. 349-356 (2000).

U.S. Appl. No. 10/147,673, filed May 16, 2002, Wang.

Wang, K., "A Plan-based Dialog System With Probabilistic Inferences," 5 pages.

Wang, K., "An Event-Driven Model for Dialogue System," Proc. ICSLP-98, (Dec. 1998).

Gorrin, A. et al., "How May I Help You?" Speech Communications, vol. 23, (1997).

"A Stochastic Model of Human-Machine Interaction for Learning Dialog Strategies," IEEE Transactions on Speech and Audio Processing, vol. 8, No. 1, pp. 11-23, (Jan. 2000).

"The Thoughtful Elephant: Strategies for Spoken Dialog Systems," IEEE Transactions on Speech and Audio Processing, vol. 8, No. 1, pp. 51-62, (Jan. 2000).

"Jupiter: A Telephone-Based Conversational Interface for Weather Information," IEEE Transactions on Speech and Audio Processing, vol. 8, No. 1, pp. 85-96, (Jan. 2000).

F. Giunchiglia et al., "Understanding Scene Descriptions by Integrating Different Sources of Knowledge," International Journal of Man-Machine Studies, vol. 37, No. 1, pp. 47-81 (Jul. 1992).

M. Rolbert, "Reference Processing in Database Query System," Tenth International Workshop, Expert Systems and their Applications, France, pp. 161-175 (May 28-Jun. 1, 1990).

http://msdn.microsoft.com/library/en-us/wss/wss/_cdo_iperson_interface.asp (Nov. 7, 2002).

Ted Pattison, "Visual Basic .NET: New Programming Model and Language Enhancements Boost Development Power", from the Feb. 2001 issue of *MSDN Magazine*.

Eckel, Bruce, "Thinking in Java," Prentice-Hall, 2000, pp. 29-35.

McIlraith et al., "Semantic Web Services," IEEE Intelligent Systems, Mar./Apr. 2001, pp. 46-53.

Spreitzer et al., "More Flexible Data Types," Proceedings of the IEEE, 8th International Workshop on Enabling Technologies (WET-ICE '99), Oct. 16-18, 1999, IEEE Computer Society, pp. 319-324.

Wang et al., "Grammar Learning for Spoken Language Understanding," In the proceedings of ASRU Workshop, Madonna di Campiglio, Italy, Dec. 9-13, 2001.

* cited by examiner

METHOD AND APPARATUS FOR FEDERATED UNDERSTANDING

BACKGROUND OF THE INVENTION

The present invention relates to methods and systems for defining and handling user/computer interactions. In particular, the present invention relates to systems that resolve user input into a command or entity.

In most computer systems, applications are written to satisfy certain classes of tasks that users wish to perform. For example, calendar applications are written to allow users to schedule meetings, find meeting information such as the date of a meeting, the meeting's attendees, and the subject of the meeting. A map application, on the other hand, is written to fulfill tasks such as obtaining directions from one location to another and obtaining a graphical image showing the area around an address. Thus, each application represents a domain of tasks that the application is able to service.

Limiting applications to specific domains is desirable because it reduces the complexity of designing applications and allows users to pay for only those tasks that they wish to have supported.

However, because each application is only able to perform tasks within its limited domain, users must keep track of which applications can be used to perform a task and must interact with a number of different applications to perform a task that crosses domains. For example, if a user wants to e-mail directions for driving to their friend's house to everyone who was at a lunch meeting on Friday, they must interact with a map application to get the directions, interact with a calendar program to determine who was at the meeting, and interact with an e-mail program to find each attendees e-mail address. The user must then embed the directions from the map application in an e-mail and send the e-mail. Thus, having separate task domains for separate applications places a burden on the user.

As such, a system is needed that allows separate applications to be maintained but that also provides a framework in which cross-domain tasks may be executed utilizing a number of different applications without placing an increased burden on the user.

SUMMARY OF THE INVENTION

A method and apparatus are provided for resolving user input that crosses different application domains to identify a discourse item such as a command or entity. To resolve the input, a discourse item definition is selected based on the user input. The discourse item definition is associated with a first application and comprises at least one defining entity that is to be used to identify a discourse item. An entity definition associated with a second application is selected based on the user input, wherein the entity defined by the definition can fulfill the role of the defining entity in the discourse item definition. An entity is then identified using the entity definition and the user input. The discourse item is identified based on the identified entity, the discourse item definition and the user input.

DETAILED DESCRIPTION OF ILLUSTRATIVE EMBODIMENTS

Figure 1:
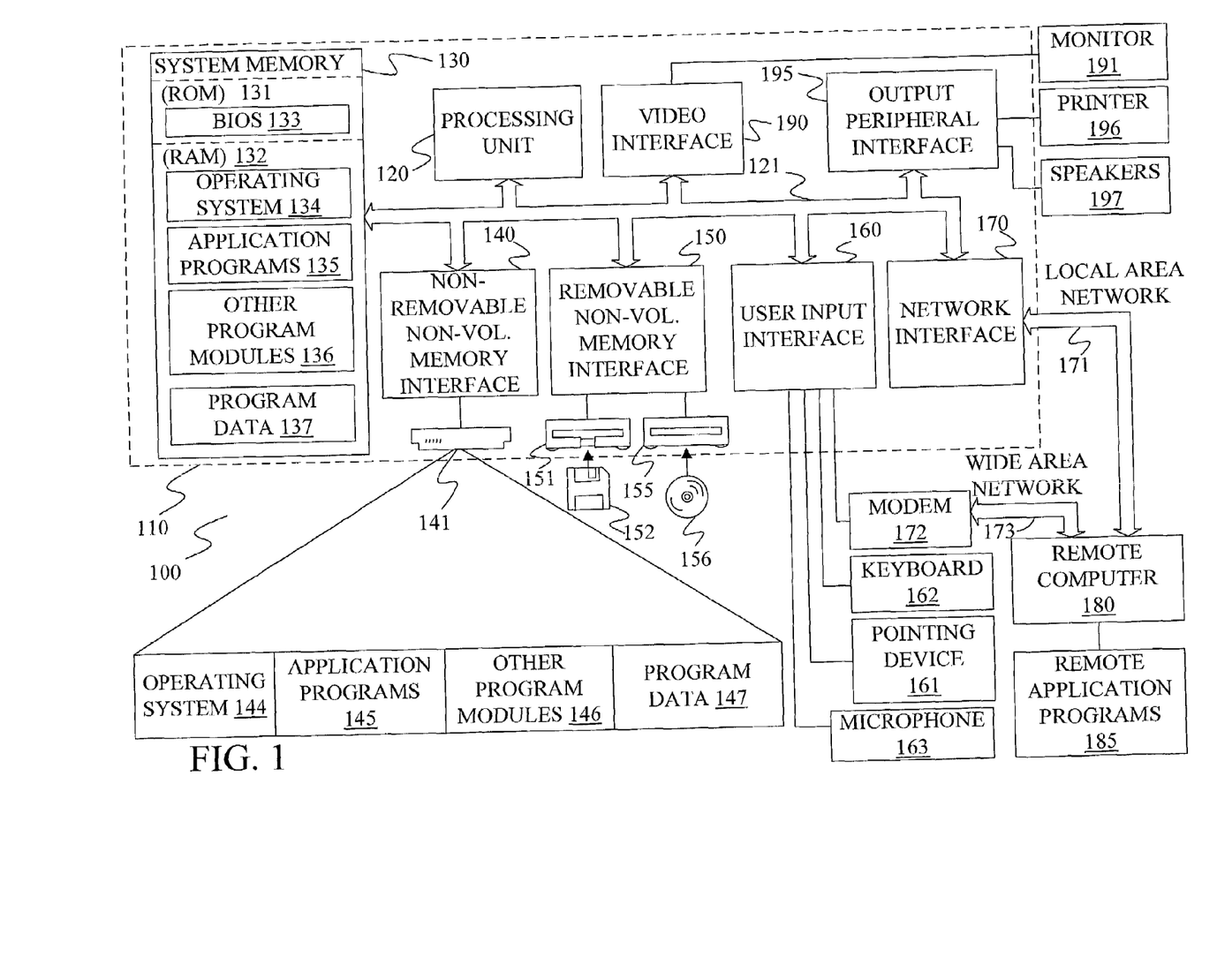
FIG. 1 is a general block diagram of a personal computing system in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
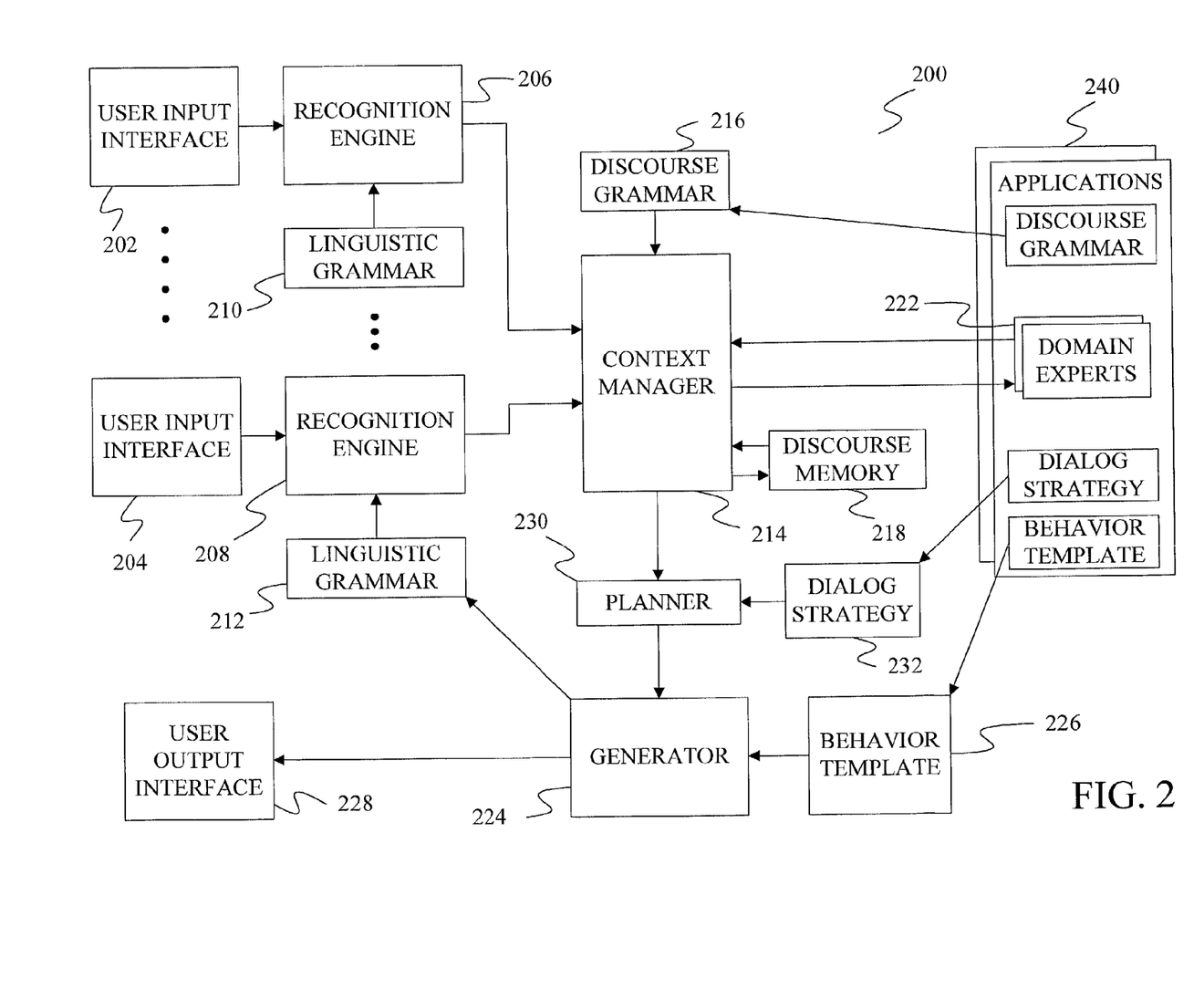
FIG. 2 is a block diagram of a system in which embodiments of the present invention may be practiced.

FIG. 2 provides a block diagram of a system in which embodiments of the present invention may be practiced. FIG. 2 is described below in connection with a method shown in the flow diagram of FIG. 3.

Under one embodiment of the invention, the components of FIG. 2 are located within a personal computer system, such as the one shown in FIG. 1. In other embodiments, the components are distributed across a distributed computing environment and connected together through network connections and protocols. For example, the components could be distributed across an intranet or the Internet.

Figure 3:
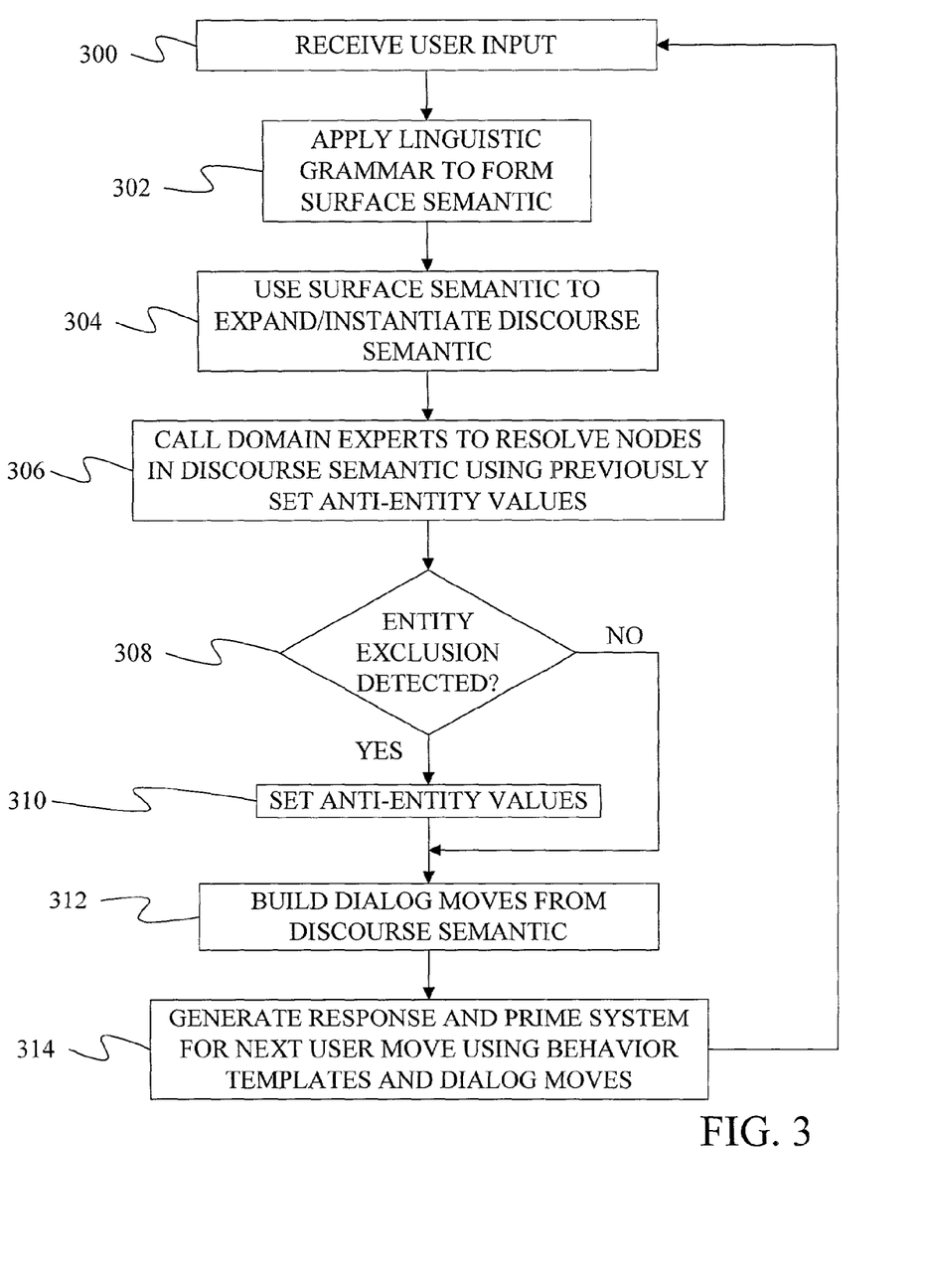
FIG. 3 is a flow diagram for a cross-domain resolution method under the present invention.

At step 300 of FIG. 3, system 200 of FIG. 2 receives input from the user through a plurality of user interfaces 202, 204. Examples of user input interfaces include a speech capture interface capable of converting user speech into text, a keyboard capable of capturing text commands and natural language text, and a pointing device interface capable of converting input from a pointing device such as a mouse or track ball into text. The present invention is not limited to these particular user input interfaces and additional or alternative user input interfaces may be used with the present invention including handwriting interfaces.

Each user input interface is provided to a surface semantic parser. In FIG. 2, a separate parser, such as 206 and 208, is provided for each user input interface. In other embodiments, a single semantic parser receives input from each of the user input interfaces.

At step 302, surface semantic parsers 206, 208 utilize linguistic grammars 210, 212, respectively, to convert the input from the user interface into a surface semantic structure. In particular, semantic parsers 206, 208 parse the input from the user interface by matching the input to one or more parse structures defined by the linguistic grammar. In the linguistic grammar, each parse structure is associated with a semantic output structure that is generated when the input matches the parse structure.

Under one embodiment, the linguistic grammar is defined using a speech text grammar format (STGF) that is based on a context-free grammar. Under this embodiment, the grammar is represented in a tagged language format extended from XML. The grammar consists of a set of rules that are defined between <rule> tags. Each rule describes combinations of text that will cause the rule to match an input text segment. To allow for flexibility in the definition of a rule, additional tags are provided. These tags include <o> tags that allow the text between the tags to be optional, <list> tags that define a list of alternatives with each alternative marked by a <p> tag wherein if any one of the alternatives matches, the list is considered to match, a <ruleref> tag that imbeds the definition of another rule within the current rule, and a <wildcard> tag that will match any text.

In one embodiment, each rule is represented internally as a series of nodes connected by transitions. Each transition represents a single word, a phrase, a rule, or a wildcard. To determine whether a rule is matched to the input, the individual words of the input are compared to the transitions for the rule to determine if a single path can be constructed that begins at the first node of the rule, ends at the last node of the rule and uses all of the words in the input. During this determination, <ruleref> tags provide pointers to other rules essentially embedding the content of the other rules within the current rule. Thus, a path that includes a <ruleref> tag is only matched by the input if the input satisfies the rule listed by the <ruleref> tag. In most embodiments, a single input can match zero, one or more than one paths through the grammar.

To allow for easy construction of the surface semantic output, <output> tags are provided within each rule. When a rule or a portion of a rule matches, also known as firing, the tags and tagged values within the <output> tags are placed as the surface semantic output. Under one embodiment, extensible style-sheet language (XSL) tags found within the <output> tags are evaluated in a recursive fashion as part of constructing the surface semantic output. In particular, <xsl:apply-template> tags are executed to locate output surface semantics that are defined in a rule that is embedded in the current rule.

An example of a linguistic grammar is:

EXAMPLE 1

```
<rule name="city">
    <list>
            <p pron="ny"> new york
            <output>
                    <city>NYC</city>
                    <state>NY</state>
                    <country>USA</country>
            </output>
            </p>
            <p pron="sf"> san francisco
            <output>
                    <city> SFO </city>
                    <state>CA</state>
                    <country>USA</country>
            </output>
            </p>
            . . .
    </list>
</rule>
<rule name="contact:locationbyperson">
    <ruleref name="person" propname="person">
    <ruleref name="structure" propname="structure"/>
    <output>
            <xsl:setname name="contact:locationbyperson">
            <contact:person type="person">
                <xsl:apply-template select="person">
            </contact:person>
            <contact:structure type="structure">
                <xsl:apply-template select="structure">
            </contact:structure>
    </output>
</rule>
<rule name="person">
        <list>
            <ruleref name="contact:possessivename">
        </list>
</rule>
<rule name="structure">
        <list>
            <ruleref name="contact:structure">
        </list>
</rule>
<rule name="contact:possesivename">
    <list>
        <p>Bill's
```

EXAMPLE 1-continued

```
            <output>Bill</output>
        </p>
        <p>Marty's
            <output>Marty</output>
        </p>
        <p>Joan's
            <output>Joan</output>
        </p>
    </list>
</rule>
<rule name="contact:structure">
    <list>
        <p>house
            <output>home</output>
        </p>
        <p>home
            <output>home</output>
        </p>
        <p>work
            <output>office</output>
        </p>
    </list>
</rule>
<rule name="citylocation">
    <list>
        <ruleref name="city">
        <ruleref name="contact:locationbyperson">
    </list>
</rule>
<rule name="bookit:itin">
        <list>
                <p>      from
                         <ruleref name="citylocation"
                              propname="orig">
                         to
                         <ruleref name="citylocation"
                              propname="dest">
                </p>
                <p>      to
                         <ruleref name="citylocation"
                              propname="dest">
                         from
                         <ruleref name="citylocation"
                              propname="orig">
                </p>
                <output>
                         <bookit:itin>
                              <bookit:destination type="citylocation">
                                   <xsl:apply-template select="dest"/>
                              </bookit:destination>
                              <bookit:origin type="citylocation">
                                   <xsl:apply-template select="orig"/>
                              </bookit:origin>
                         </bookit:itin>
                </output>
                <list>
</rule>
```

In Example 1, the linguistic grammar is a combination of linguistic grammars formed by separate applications. Specifically, the linguistic grammar of Example 1 has eight rules where rules "person", "structure", "contact:possesivename", "contact:structure", and "contact:locationbyperson" are provided by a contacts application, rule "city" is provided in a standard linguistic grammar, and rules "bookit:itin" and "citylocation" are provided by a travel booking application.

In most embodiments, application authors do not include rule references to grammar rules produced by other applications. Thus, a contacts application would generally not make a direct reference to a rule authored in a travel booking application. By limiting this type of direct reference, application authors are free to modify their grammar as needed without jeopardizing the operation of other applications.

To allow a transition from a rule defined by one application to a rule defined by another application, a context manager 214 is provided which receives linguistic grammars, discourse semantic schema and discourse semantic definitions from various applications and which modifies the linguistic grammars of one or more applications based on the linguist grammar, discourse semantic schema and discourse semantic definitions of other applications.

Under one embodiment, discourse semantic structures are defined using a tagged language. Two outer tags, <command> and <entity>, are provided that can be used to designate the discourse semantic as relating to one of two possible discourse items: a command or an entity. Thus, a discourse semantic definition with an outer tag of <command> would be a discourse item definition for a command such as send, open, or find, while a discourse semantic definition with an outer tag of <entity>would be a discourse item definition for an entity such as a person, a place, a time, or a document. Note that these are just examples of possible commands and entities and other commands or entities are within the scope of the present invention.

Both of the outer tags have a "type" attribute and an optional "name" attribute. The "type" attribute is used to set the class for the entity or command. For example, an entity can have a "type" of "PERSON". Note that multiple entities and commands can be of the same type.

Ideally, the "name" for a command or entity is unique. Under one embodiment, a hierarchical naming structure is used with the first part of the name representing the application that defined the discourse semantic structure. For example, a discourse semantic structure associated with sending an e-mail and constructed by an e-mail program could be named "OutlookMail:sendmail". This creates multiple name spaces allowing applications the freedom to designate the names of their semantic structures without concern for possible naming conflicts.

If an entity has a type specified but does not have a name specified, the type is used as the name. In most embodiments, if the type is used as the name, the type must be unique.

Between the <entity> or <command> tags are one or more <slot> tags that define the type and name of entities that are needed to resolve the <entity> or <command>. An <expert> tag is also provided that provides the address of a program that uses the values in the slots to try to resolve the <entity> or <command>. Such programs are shown as domain experts 222 in FIG. 2 and are typically provided by the application that defines the discourse semantic in which the domain expert is listed. In other embodiments, however, the domain expert is separate from the application and is called as a service.

An example of a semantic definition for a discourse semantic is:

EXAMPLE 2

```
<entity type="Bookit:itin">
    <slot type="citylocation"
            name="bookit:destination"/>
    <slot type="citylocation"
            name="bookit:origin"/>
    <slot type="date_time"
            name="bookit:traveldate"/>
    <expert>www.bookit.com/itinresolve.asp
    </expert>
</entity>
<entity          type="citylocation"
            name="contact:locationbyperson">
    <slot type="person"
            name="contact:person"/>
    <slot type="structure"
            name="contact:structure"/>
    <expert>
            www.contact.com/locatebyperson.asp
    </expert>
</entity>
```

In addition, an application that defines an entity type publishes a schema that describes the kinds of values that represent the entity type and the format into which entities of this type should be resolved. For instance, if an application defined an entity type of "city-state", it could publish the schema to indicate that an entity of "city-state" should be resolved into a format of "[city], [state]" where [city] is the full name of the city and [state] is the two-letter abbreviation for the state.

If an application wishes to allow other applications to provide an entity for a slot, it defines a grammar rule that has a name that matches the type of the slot. For example, if the travel booking application wanted to allow other applications to provide the entity for the "bookit:destination" slot, it would provide a rule with the name "citylocation". In the example linguistic grammar above, such a rule was provided as:

```
<rule name="citylocation">
    <list>
        <ruleref name="city">
        <ruleref name="contact:locationbyperson">
    </list>
</rule>
```

Initially, when the travel booking application created this rule, it did not include the <ruleref> tag for "contact:locationbyperson" because the travel booking application did not know if any other application would support this entity. Instead, the rule simply included the list tags and the <ruleref> tag for "city".

The <ruleref> tag for "contact:locationbyperson" was added by context manager 214 upon receiving the linguistic grammar and discourse semantic definitions provided by the contacts application. In particular, context manager 214 found that the contacts application's linguistic grammar included a rule with the name "contact:locationbyperson" and that the contacts application's discourse semantic definition included an entity with the same name and a type of "citylocation". Since this type matched the slot type associated with the travel booking application, context manager 214 located the grammar rule for that slot type and added a <ruleref> tag for the "contact:locationbyperons" rule.

As part of adding <ruleref> tags to the linguistic grammar, context manager 214 maintains a list of applications that are currently registered with the context manager. When an application is no longer registered with the context manager, references to the application's rules are removed from the linguistic grammar.

Note that because different applications can use slots of the same type, it is possible that two applications will each provide a rule having the same name as a single slot type. When this occurs, context manager 214 combines the rules into a single rule. This can be done easily since both rules simply consist of a list of <ruleref> tags. Note that under most embodiments, the list of <ruleref> tags in the latest received rule are added to the existing list for the rule of the same name.

Thus, the present invention is able to allow matching to cross domain boundaries between applications without requiring applications to interact with each other.

When the matching portion is completed, the stored paths that represent successful matches to the input are accessed and are used to construct the output. In particular, each top-level rule for the path is first accessed to locate its output tags. The values within the output tags are then placed in the surface semantic. If a <xsl:apply-template/> tag is found in the output, it is evaluated by locating a tag along the matching with a propname attribute that matches the "select" value in the <xsl:apply-template/> tag. For example, for the <xsl:apply-template select="dest"/>, the <list propname=dest"/> tag is located.

Any output tags found along the path within the tags containing the matching propname attribute are then inserted in place of the <xsl:apply-template> tag. In addition, the output tags can include directions to place a name attribute in the tag in which the xsl:applytemplate tag is found. For Example 1, this produces:

```
<bookit:itin>
    <bookit:destination type="citylocation"
        name="contact:locationbyperson">
        <contact:person type="person">
// result of
//          <xsl:apply-template select="person">
// will be put here
        </contact:person>
        <contact:structure type="structure">
// result of
//          <xsl:apply-template
//              select="structure">
// will be put here
        </contact: structure>
    </bookit:destination>
    <bookit:origin type="citylocation">
// result of
//          <xsl:apply-template select="orig"/>
// will be put here
    </bookit:origin>
</bookit:itin>
```

The <xsl:apply-template> tags of the inserted values are then evaluated by looking for tags with a propname equal to the "select" value in the apply-template tags. This process continues until all of the <xsl:apply-template> tags have been evaluated. For Example 1, this results in a surface semantic of:

```
<bookit:itin>
    <bookit:destination type="citylocation"
        name="contact:locationbyperson">
        <contact:person type="person">
            Bill
        </contact:person>
        <contact:structure type="structure">
            home
        </contact:structure>
    </bookit:destination>
    <bookit:origin type="citylocation"
        name="contact:locationbyperson">
        <contact:person type="person">
            Marty
        </contact:person>
        <contact:structure type="structure">
            office
        </contact:structure>
    </bookit:origin>
</bookit:itin>
```

The tags within the surface semantic output can also include one or more attributes including a confidence attribute that indicates the confidence of the semantic structure marked by the tags. Thus, in the example above, the:

<bookit:origin type="citylocation"name="contact:locationbyperson"> tag could be modified to:

<bookit:origin type="citylocation"name="contact:locationbyperson" confidence="90"> to indicate that the confidence of the city location between the tags is ninety percent.

Returning to FIGS. 2 and 3, the surface semantics produced by surface semantic parsers 206, 208 are provided to a context manager 214, which uses the surface semantics to build a discourse semantic structure at step 304 of FIG. 3.

When context manager 214 receives the surface semantics from parsers 206, 208, it uses the surface semantics to instantiate and/or expand a discourse semantic structure defined in a discourse grammar 216. Under one embodiment, discourse semantic definitions in discourse grammar 216 are generated by one or more applications 240. For example, an e-mail application may provide one set of discourse semantic definitions and a contacts application may provide a different set of discourse semantic definitions.

Figure 4:
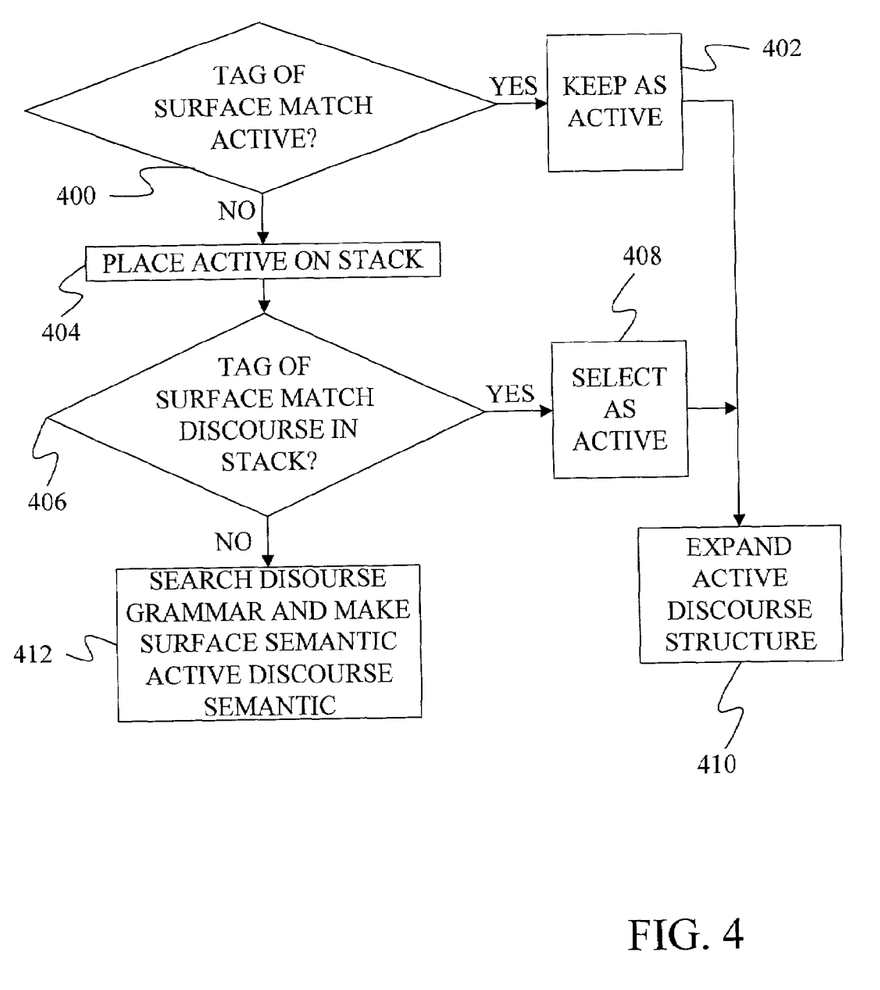
FIG. 4 is a flow diagram of a method of expanding discourse semantic structures under one embodiment of the present invention.

FIG. 4 provides a flow diagram for expanding and instantiating discourse semantic structures based on the surface semantic. When the surface semantic is provided to context manager 214, the top tag in the surface semantic is examined to determine if a discourse semantic structure has already been started for the surface semantic. This would occur if the system were in the middle of a dialogue and a discourse semantic structure had been started but could not be completely resolved. Under one embodiment, multiple partially filled discourse semantic structures can be present at the same time. The discourse semantic structure that was last used to pose a question to the user is considered the active discourse semantic structure. The other partially filled discourse semantic structures are stored in a stack in discourse memory 218 and are ordered based on the last time they were expanded.

Thus, at step 400, context manager 214 first compares the outer tag of the surface semantic to the semantic definitions of the active discourse semantic structure to determine if the tag should replace an existing tag in the active discourse semantic structure or if the tag can be placed in an unfilled slot of the active discourse semantic structure. Under most embodiments, this determination is made by comparing the tag to the type or to the name and type of an existing tag in the active structure and any unfilled slots in the active discourse semantic structure. If there is a matching tag or unfilled slot, the active discourse semantic structure remains active at step 402. If the tags do not match any existing tags or an unfilled slot, the active discourse semantic structure is placed on the stack at step 404 and the discourse semantic structures on the stack are examined to determine if any of them have a matching tag or matching unfilled slot. If there is a tag or unfilled slot in one of the discourse semantic structures in discourse memory 218 that matches the surface semantics at step 406, the matching discourse semantic structure is made the active discourse semantic structure at step 408.

The active discourse semantic structure is then updated at step 410 using the current surface semantic. First, tags that satisfy unfilled slots are transferred from the surface semantic into the discourse semantic structure at a location set by the discourse semantic definition. Second, the tags in the surface semantic that match existing tags in the discourse semantic structure are written over the identically named tags in the discourse semantic structure.

If a matching discourse semantic structure cannot be found in the discourse memory at step 406, the surface semantic becomes the discourse semantic structure at step 412.

An example of a discourse semantic structure for an input "I want to fly to Bill's from Tulsa, Okla. on Saturday at 9" is:

EXAMPLE 3

```
<Bookit:itin>
    <bookit:destination type="citylocation"
        name="contact:locationbyperson">
        <contact:person>Bill
        </contact:person>
    </bookit:destination>
    <bookit:origin>Tulsa,OK</bookit:origin>
```

EXAMPLE 3-continued

```
<bookit:date_time>
    <Date>Saturday</Date>
    <Time>9:00</Time>
</bookit:date_time>
</Bookit:itin>
```

Note that the resulting discourse semantic includes entities from multiple applications. In particular, slots defined by one application can be filled with an entity resolved by a different application. For example, in the discourse semantic above, the slot "bookit:destination" defined by the travel booking application is filled with the contact:locationbyperson entity defined by the contacts application.

One aspect of the present invention is that when a slot defined by one application is filled with an entity defined by a separate application, the application that defined the slot does not need to know of the existence or operation of the application that will provide the entity. In fact, the application that defines the slot does not care how the entity is initially identified. It can be identified by direct input from the user, through an entity defined by the same application that defined the slot, or through an entity defined by a different application. All that is important is that the entity used to fill the slot be of the same type as the type found in the slot definition.

After an active discourse semantic structure has been instantiated or expanded at step 304, the context manager attempts to resolve entities at step 305. Specifically, the context manager tries to resolve ambiguous references in the surface semantics, using dialog history or other input modalities. In the above example, the reference to a person named "Bill" might be ambiguous on its own. However, if it is clear from the dialog context that "Bill" here refers to a specific person mentioned in the previous turn, the context manager can resolve the ambiguity (known as ellipsis reference in linguistic literature) into a concrete entity by inserting additional information, e.g., the last name "Smith". Similarly, the date reference "Saturday" may be ambiguous on its own. However, if from the context it is clear that the Saturday mentioned in the current utterance is "12/01/02", the context manager can simply resolve this date reference by replacing "Saturday" with "12/01/02". Note that these insertions and/or replacements are subject to further verification by the domain experts as explained later.

In the example above, if "Bill" could not be resolved but Saturday could, step 305 would produce the discourse semantic structure:

```
<Bookit:itin>
    <bookit:destination type="citylocation"
    name="contact:locationbyperson">
        <contact:person>Bill
        </contact:person>
    </bookit:destination>
    <bookit:origin>Tulsa,OK</bookit:origin>
    <bookit:date_time>12/01/02:9:00
    </bookit:date_time>
</Bookit:itin>
```

Once the active discourse structure has been partially resolved, if possible, at step 305, domain experts are invoked at step 306 to further resolve entities in the active discourse structure.

Under one embodiment, domain experts associated with inner-most tags (the leaf nodes) of the discourse semantic structure are invoked first in the order of the slots defined for each entity. Thus, in the example above, the domain expert for the contact:locationbyperson entity would be invoked first.

As mentioned above, the domain expert that is invoked to resolve an entity is selected by the application that defines the entity. Thus, multiple applications can be used to resolve the various entities found in the discourse semantic structure. This allows applications to focus on resolving entities within their domain while also allowing the resolution of complex user inputs that cross multiple application domains. For instance, the travel booking application does not need to be written to resolve a reference to a city that is provided as a reference to the location of a person's home. Instead, the contacts application, which knows where a person's home is located, can resolve the city entity for the travel booking application. Note that as mentioned above, the travel booking application does not have to know about the existence of the contacts application. By defining the entity type that it wants in a slot, the travel booking application is able to have its discourse semantic structure expanded by any application that is able to resolve an entity of that type.

The call to the domain expert has three arguments: a reference to the node of the <entity> or <command> tag that listed the domain expert, a reference to entity memories in discourse memory 218, and an integer indicating the outcome of the domain expert (either successful resolution or ambiguity).

Under one embodiment, the reference to the entity memory is a reference to a stack of entities that have been explicitly or implicitly determined in the past and that have the same type as one of the slots used by the domain expert. Each stack is ordered based on the last time the entity was referenced. In addition, in some embodiments, each entity in the stack has an associated likelihood that indicates the likelihood that the user may be referring to the entity even though the user has not explicitly referenced the entity in the current discourse structure. This likelihood decays over time such that as more time passes, it becomes less likely that the user is referring to the entity in memory. After some period of time, the likelihood becomes so low that the entity is simply removed from the discourse memory.

Under some embodiments of the present invention, discourse memory 218 also includes anti-entity stacks. The anti-entity stacks are similar to the entity stacks except they hold entities that the user has explicitly or implicitly excluded from consideration in the past. Thus, if the user has explicitly excluded the name Joe Smith, the "Person" anti-entity stack will contain Joe Smith.

Like the entity stack, the anti-entity stack decays over time by applying a decaying likelihood attribute to the anti-entity. This likelihood can be provided as a negative number such that if an entity appears in both the entity stack and the anti-entity stack, the likelihoods can be added together to determine if the entity should be excluded from consideration or included as an option.

Entities in the anti-entity stack can be removed when their confidence level returns to zero or if the user explicitly asks for the entity to be considered.

The entity memory allows the domain expert to resolve values that are referred to indirectly in the current input from the user. This includes resolving indirect references such as deixis (where an item takes its meaning from a preceding word or phrase), ellipsis (where an item is missing but can be naturally inferred), and anaphora (where an item is identified by using definite articles or pronouns) Examples of such implicit references include statements such as "Send it to Jack", where "it" is an anaphora that can be resolved by looking for earlier references to items that can be sent or "Send the message to his manager" where "his manager" is a deixis that is resolved by determining first who the pronoun "his" refers to and then using the result to look for the manager in the database.

The domain expert also uses the anti-entity stacks to resolve nodes. In particular, the domain expert reduces the likelihood that a user was referring to an entity if the entity is present in the anti-entity stack.

This reduction in likelihood can occur in a number of ways. First, the confidence score provided for the entity in the surface semantic can be combined with the negative likelihood for the entity in the anti-entity stack. The resulting combined likelihood can then be compared to some threshold, such as zero. If the likelihood is below the threshold, the domain expert will not consider the entity as having been referenced in the user's input.

Alternatively or in combination with the technique above, a likelihood for the entity in the entity stack is combined with the negative likelihood for the entity in the anti-entity stack to produce the reduced likelihood for the entity. This reduced likelihood is then compared to the threshold.

Using the contents found between the tags associated with the domain expert and the values in the discourse memory, the domain expert attempts to identify a single entity or command that can be placed between the tags. If the domain expert is able to resolve the information into a single entity or command, it updates the discourse semantic structure by inserting the entity or command between the <entity> or <command> tags in place of the other information that had been between those tags.

If the domain expert cannot resolve the information into a single entity or command, it updates the discourse semantic structure to indicate there is an ambiguity. If possible, the domain experts update the discourse semantic structure by listing the possible alternatives that could satisfy the information given thus far. For example, if the domain expert for the contact:locationbyperson entity determines that there are three people named Bill in the contact list, it can update the discourse semantic structure as:

```
<Bookit:itin>
    <bookit:destination type="citylocation"
        name="contact:locationbyperson">
        <contact:person
            alternative=3>
            <choice>
                Bill Bailey
            </choice>
            <choice>
                Bill Parsens
            </choice>
            <choice>
                Bill Smith
            </choice>
        </contact:person>
    <bookit:destination/>
    <bookit:origin>Tulsa,OK</bookit:origin>
    <bookit:date_time>12/01/02:9:00
    </bookit:date_time>
</Bookit:itin>
```

The domain expert also updates the entity memory of discourse memory 218 if the user has made an explicit reference to an entity or if the domain expert has been able to resolve an implicit reference to an entity.

In addition, at step 308, the domain expert determines if an entity has been excluded by the user. For example, if the user asks to book a flight from "Bill's house to Florida" and the dialog system determines that there are a number of people named Bill, it may ask if the user meant. "Bill Smith." If the user says "No," the domain expert can use that information to set an anti-entity value for the entity "Bill Smith" at step 310. Under one embodiment, setting the anti-entity value involves placing the entity in the anti-entity stack. In other embodiments, setting an anti-entity value involves changing the discourse semantic structure to trigger a change in the linguistic grammar as discussed further below or directly changing the linguistic grammar.

If the domain expert cannot resolve its entity or command, the discourse semantic structure is used to generate a response to the user. In one embodiment, the discourse semantic structure is provided to a planner 232, which applies a dialog strategy to the discourse semantic structure to form a dialog move at step 312. The dialog move provides a device-independent and input-independent description of the output to be provided to the user to resolve the incomplete entity. By making the dialog move device-independent and input-independent, the dialog move author does not need to understand the details of individual devices or the nuances of user-interaction. In addition, the dialog moves do not have to be re-written to support new devices or new types of user interaction.

Under one embodiment, the dialog move is an XML document. As a result, the dialog strategy can take the form of an XML style sheet, which transforms the XML of the discourse semantic structure into the XML of the dialog move. For clarity, the extension of XML used as the dialog moves is referred to herein as DML.

Under most embodiments of the present invention, the dialog strategy is provided to context manager 214 by the same application that provides the discourse semantic definition for the node being used to generate the response to the user. Thus, applications can write strategies that are best designed to help the application's domain expert resolve the ambiguity.

The dialog moves are provided to a generator 224, which generates the physical response to the user and prepares the dialog system to receive the next input from the user at step 314. The conversion from dialog moves to response is based on one or more behavior templates 226, which define the type of response to be provided to the user, and the actions that should be taken to prepare the system for the user's response. Under one embodiment, the behavior templates are defined by the same application 240 that defined the discourse semantic structure.

Since the application that is trying to resolve the entity provides the dialog strategy and the behavior templates, the interactions with the user will be application specific. In addition, during the resolution of different entities by different applications, the user interface can change to provide the best interface for resolving each entity. For example, if the user wants to "Send the picture of Jack to Bill", a picture storage application may provide an interface that displays all of the pictures of Jack in order to resolve which picture the user wants to send, while an e-mail application provides a simple list of people named "Bill" to resolve which Bill the pictures should go to.

By placing the burden of disambiguation on the applications responsible for the entity, a single user interface does not have to be written that takes into account all of the possible user interfaces that could be used to resolve an ambiguity. Note, however, that the present invention contemplates that the user interfaces provided by the individual applications can appear within a standard interface so that it appears to the user that they are working with an integrated system. In addition, if an application does not provide a dialog strategy or behavior templates for resolving an entity, planner 230 and generator 224 can use standard dialog strategies and behavior templates to interact with the user.

Under the present invention, preparing for the user's response can include priming the system by altering the linguistic grammar so that items previously excluded by the user are not returned in the surface semantics or if returned are given a lower confidence level. By altering the linguistic grammar in this manner, the domain experts are less likely to consider the excluded items as being a choice when resolving the semantic node.

The linguistic grammar can be altered in two different ways to lower the confidence level for an anti-entity. The first way is to alter the matching portion of the grammar so that the anti-entity cannot be matched to the input. The second way is to alter the surface semantic output portion of the linguistic grammar so that even if matched, the anti-entity is not returned or if it is returned, is returned with a low confidence level.

The behavioral templates can include code for calculating the cost of various types of actions that can be taken based on the dialog moves. The cost of different actions can be calculated based on several different factors. For example, since the usability of a dialog system is based in part on the number of questions asked of the user, one cost associated with a dialog strategy is the number of questions that it will ask. Thus, an action that involves asking a series of questions has a higher cost than an action that asks a single question.

A second cost associated with dialog strategies is the likelihood that the user will not respond properly to the question posed to them. This can occur if the user is asked for too much information in a single question or is asked a question that is too broadly worded.

Lastly, the action must be appropriate for the available output user interface. Thus, an action that would provide multiple selections to the user would have a high cost when the output interface is a phone because the user must memorize the options when they are presented but would have a low cost when the output interface is a browser because the user can see all of the options at once and refer to them several times before making a selection.

The domain expert can also take the cost of various actions into consideration when determining whether to resolve an entity. For example, if the domain expert has identified two possible choices for an entity, with one choice having a significantly higher confidence level, the domain expert may decide that the cost of asking the user for clarification is higher than the cost of selecting the entity with the higher score. As a result, the domain expert will resolve the entity and update the discourse semantic structure accordingly.

Although the present invention has been described with reference to preferred embodiments, workers skilled in the art will recognize that changes may be made in form and detail without departing from the spirit and scope of the invention. In particular, although the invention has been described above with reference to XML-based tagged languages, the data constructs may be formed using any of a variety of known formats including tree structures.

What is claimed is:

1. A method of resolving user input that crosses different application domains to identify a discourse item, the method comprising:

matching a first portion of the user input to a first grammar rule comprising a description of a first surface semantic structure within output tags;

matching a second portion of the user input to a second grammar rule comprising a description of a second surface semantic structure within output tags;

constructing the first surface semantic structure;

constructing the second surface semantic structure;

modifying the constructed first surface semantic structure based on the constructed second surface semantic structure to form an output surface semantic structure;

constructing a discourse semantic structure based on the output surface semantic structure, the discourse semantic structure comprising information between tags representing an entity;

a processor providing a discourse item definition associated with a first application, the discourse item definition comprising at least one slot for a defining entity that is to be used to identify a discourse item, the slot providing an entity type and a name for the defining entity, the discourse item definition further comprising an identification of a first domain expert;

a processor providing an entity definition associated with a second application, the entity definition having a type that matches the entity type provided by the slot and a name that differs from the name provided by the slot and the entity definition defining an entity that can fulfill the role of the defining entity in the discourse item definition, the entity definition further comprising an identification of a second domain expert different from the first domain expert;

identifying an entity based on the entity definition and at least a portion of the user input by passing a reference to a node in the discourse semantic structure to the second domain expert, which identifies the entity based in part on information in the discourse semantic structure;

updating the discourse semantic structure by inserting the identified entity in the discourse semantic structure by replacing the information representing the entity with the identified entity; and identifying a discourse item based on the discourse item definition and the identified entity by passing a reference to a node in the discourse semantic structure to the first domain expert, which identifies the discourse item based in part on the identified entity.

2. The method of claim 1 wherein the second domain expert is associated with the second application but not the first application.

3. A tangible computer-readable storage medium providing computer-executable instructions for performing steps to provide and use extensible discourse semantic definitions to resolve a user input into a discourse item, the steps comprising:

providing a first discourse semantic definition comprising a slot for an entity, the slot having a type attribute set equal to a first type and comprising an identification of a first domain expert;

providing a second discourse semantic definition for an entity of the first type such that the second discourse semantic definition comprises a name attribute and a type attribute set equal to the first type for the entity and such that the second discourse semantic definition describes a second type of information needed to identify the entity without containing that information, and comprises an identification of a second domain expert;

constructing an initial discourse semantic structure by matching a portion of the user input to a first grammar rule that describes a first surface semantic structure within output tags in the first grammar rule, constructing the first surface semantic structure, and using the constructed first surface semantic structure as the initial discourse semantic structure;

matching a second portion of the user input to a second grammar rule that describes a second surface semantic structure within output tags in the second grammar rule;

constructing the second surface semantic structure described in the second grammar rule;

inserting the constructed second surface semantic structure into the initial discourse semantic structure to produce an expanded discourse semantic structure; and using the expanded discourse semantic structure to resolve the user input into a discourse item by using the second domain expert of the second discourse semantic definition associated with the second surface semantic structure to resolve the entity of the first type for the slot.

4. The computer-readable storage medium of claim 3 further comprising providing more than one discourse semantic definition for entities of the first type.

5. The computer-readable storage medium of claim 4 wherein providing more than one discourse semantic definition for entities of the first type comprises providing a third discourse semantic definition that specifies a different domain expert from the second domain expert specified by the second discourse semantic definition.

6. The computer-readable storage medium of claim 4 wherein providing more than one discourse semantic definition for entities of the first type comprises providing a third discourse semantic definition having a different number of slots than the second discourse semantic definition.

7. The computer-readable storage medium of claim 4 wherein providing more than one discourse semantic definition for entities of the first type comprises providing a third discourse semantic definition that is associated with a first application and wherein the second discourse semantic definition is associated with a second application.

8. The computer-readable storage medium of claim 3 wherein using the expanded discourse semantic structure to resolve the user input further comprises:

receiving a change to the discourse semantic structure from the second domain expert; and using the change to the discourse semantic structure and a behavior template to generate an output to the user.

9. The computer-readable storage medium of claim 8 wherein the behavior template is associated with a same application that is associated with the second domain expert.

* * * * *